ns Patent [19]

Winders

[11] 4,268,332
[45] May 19, 1981

[54] METHOD OF MAKING PRECISION PARABOLIC REFLECTOR APPARATUS

[75] Inventor: Gordon R. Winders, Raleigh, N.C.

[73] Assignee: Sun Trac Industries, Inc., Oak Ridge, Tenn.

[21] Appl. No.: 97,215

[22] Filed: Nov. 26, 1979

Related U.S. Application Data

[60] Continuation-in-part of Ser. No. 904,226, May 8, 1978, abandoned, which is a division of Ser. No. 747,334, Dec. 3, 1976, abandoned.

[51] Int. Cl.³ .................. B32B 31/04; G02B 5/10
[52] U.S. Cl. ....................... 156/160; 126/417; 156/196; 156/242; 156/280; 156/297; 350/293
[58] Field of Search ............... 156/163, 245, 229, 196, 156/280, 297, 160, 242; 126/270, 271, 417, 418; 350/125, 293

[56] References Cited

U.S. PATENT DOCUMENTS

| | | | |
|---|---|---|---|
| 3,264,392 | 8/1966 | Taplin | 264/231 |
| 3,654,012 | 4/1972 | Schlager | 156/212 |
| 3,655,472 | 4/1972 | Chandler | 156/163 |
| 3,855,027 | 12/1974 | Erdmann et al. | 156/245 |
| 4,032,089 | 6/1977 | Kinsler | 156/229 |
| 4,115,177 | 9/1978 | Nelson | 156/245 |
| 4,188,358 | 2/1980 | Withoos et al. | 156/245 |

FOREIGN PATENT DOCUMENTS 485390  5/1938  United Kingdom ............... 350/293

Primary Examiner—Jerome W. Massie
Attorney, Agent, or Firm—Frost & Jacobs

[57] ABSTRACT

An improved method of making a high precision trough shaped parabolic reflector apparatus is described. A smooth surfaced sheet of flexible material is bent and formed over a convex mold comprising a number of precision shaped parabolic arcs mounted to a base. Means are provided for clamping the flexible sheet of material and drawing it into close conformity with the convex mold. The backside or convex side of the sheet of material is then cemented to a support framework comprising a number of approximately parabolic, but not necessarily precision formed web or rib members which are joined together by a torsion tube or similar structural stiffening means. The type of cement utilized accurately fills any discontinuities and/or inaccuracies in the arcuate shape of the approximately parabolic ribs so that the ribs and the flexible sheet are bonded rigidly together as a unit without distortion or strain on the sheet. The approximately parabolic, but non-precision ribs and stiffening means thereafter serve to maitain the sheet of flexible material in a highly accurate and precision parabolic contour produced by the precision parabolic mold.

6 Claims, 6 Drawing Figures

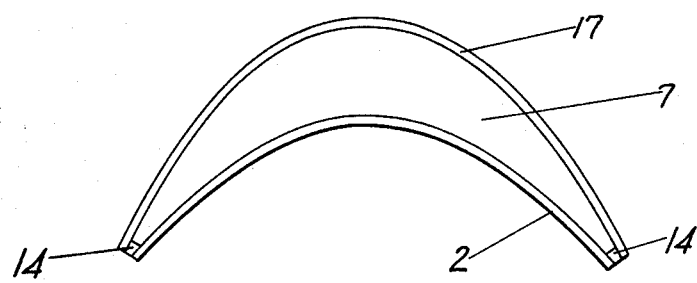

METHOD OF MAKING PRECISION PARABOLIC REFLECTOR APPARATUS

CROSS-REFERENCE TO RELATED APPLICATIONS

This application is a continuation-in-part of application Ser. No. 904,226, filed May 8, 1978, now abandoned, which in turn is a division of application Ser. No. 747,334, filed Dec. 3, 1976, now abandoned.

TECHNICAL FIELD

This invention relates to solar collector apparatus in general and to parabolic trough shaped reflecting concentrators in particular. It relates specifically to a method of forming precision shaped parabolic trough reflectors.

BACKGROUND ART

Since at least 1882, as shown in U.S. Pat. No. 257,580 issued to Ditzler, parabolic trough shaped reflectors have been utilized to track the diurnal movements of the sun to focus the image of the sun upon a collection tube set at the focal point along the axis of focus for such a reflector. Since this early date, many attempts have been made to provide parabolic trough shaped concentrators for solar energy and all have met with a greater or lesser degree of success. Of course, one of the primary objects of the early art, which is continued forward to the present day, is the requirement that the collector be as faithfully parabolic as is possible or obtainable since slight inaccuracies of curvature will move the location of the focal point or axis off line, thus greatly reducing or eliminating the efficacy of such collectors. A second problem inherent in the prior art is the structural stability of the parabolic surface. Ideally, it would be desirable that the parabolic surface be formed or hewn from a solid block of material so that temperature variations, etc., would be uniformly compensated for and the line of focus for the trough shaped collector will remain unchanged.

In practice, the prior art has utilized structural frameworks with necessary stiffeners and arcuate ribs instead of the massive, expensive and unwieldy solid blocks of material. For example, the Podolny patent. U.S. Pat. No. 3,070,703, shows a solar power plant in which parabolic trough shaped collectors utilize a structural frame and stiffeners to support parabolically curved reflecting surface. U.S. Pat. No. 2,141,330 also shows a parabolic trough shaped collector formed of a framework intended to maintain the structural uniformity and integrity of the resultant concentrator.

Such structures require numerous, highly accurate parabolic arcuate support ribs which are expensive to make and which must be precise since the resulting form of the trough collector depends entirely upon the arcuate shape of the parabolic structural ribs. Some prior art devices have even resorted to adjustment screws or tensioning means to vary the parabolic surface for focusing reasons. A structure of this type is shown in British Pat. Specification No. 485,390 of May 19, 1938, in which an assembled structure of carefully machined ribs forms a concave mold to which a sheet of reflector material is permanently attached by fasteners. Much of the precision is lost because of eventual racking of the necessarily loose fit of bolt and rivets in drilled holes.

An attempt to alleviate the expense and difficulty of forming parabolic trough collectors utilizing a framework with numerous high precision parabolic ribs is shown in U.S. Pat. No. 3,959,056 in which a method of forming parabolic panels using honeycomb panels, foamed plastic, glass fibers, and impregnating resin is shown in which a continuous trough can be continuously molded to any length desired. Very expensive and complex equipment is required for such a forming technique and the resulting parabolic surface of the trough shaped collector may be subject to thermal distortion or other mechanical difficulties because of the nature of the materials utilized.

Another approach to reducing the cost of making reflectors has been to substantially sacrifice the degree of precision used in manufacture by using simplified molds on which the reflector's parabolic face is formed. Erdman, et al, U.S. Pat. No. 3,855,027, uses an air-inflated mold of flexible material on which a sheet of fiber reinforced polyester resin is fabricated by conventional spray lay-up technique. This sheet is then rendered suitably stiff and rigid by incorporating reinforcing ribbing in a second layer consisting of foamed polyurethane, followed by a third layer of spray lay-up fiber reinforced polyester. Even though the structure may retain reasonable rigidity in use, the vital precision required in the reflector surface can be no greater than that of the low pressure "balloon" on which it was formed (Column 4, lines 10-15) and this is given as a surface accuracy of 0.060 inches rms, Column 3, line 43. A similar technique is used by Chandler, U.S. Pat. No. 3,655,472, in which air pressure inflates an aluminum foil, which becomes the finished surface after layers of fiber reinforced resins are applied, again by spray lay-up. In view of the well known shrinkage characteristics of polymerization of resins during hardening, it is obvious that precision must be lost when this warping reaction is resisted only by an air inflated elastic substrate.

Nelson, U.S. Pat. No. 4,115,177, utilizes a rigid permanent mold, instead of air pressure, on which to fabricate a parabolic shaped sheet made by applying several layers of spray lay-up fiber reinforced thermosetting plastic, and finally vacuum depositing aluminum to form the reflector surface.

Some approaches have been made to improve the precision, yet retain the use of low cost molding, by substituting foamed polyurethane or the like for the air-inflated membrane as the form. Taplin, in U.S. Pat. No. 3,264,392 uses such a form, but in a male-female die forming technique. Schlager, U.S. Pat. No. 3,654,012, applies a heat softened sheet of plastic over a preformed mold of foamed polystyrene, actually melting the surface of the foamed plastic to create a bond with the sheet. Obviously these methods preclude any degree of precision, first because it is not possible to precision form foamed plastic, and second because heating and melting of the formed plastic alters the original contours.

In light of the foregoing difficulties mentioned with regard to the prior art, it is an object of the present invention to provide an improved method of forming precision parabolic reflector surfaces of the trough type for use as solar energy concentrators or collectors.

DISCLOSURE OF THE INVENTION

The foregoing and still other unmentioned objects of the present invention are met by providing a precision convex parabolic mold over which may be formed a sheet of flexible smooth surfaced material. Many materials such as glass fiber reinforced epoxy panels, bonded wood chip particle board, metal sheets, or any other flexible and hard surfaced material may be used. The material is capable of being formed at least on one axis of bending and is stiff enough in the opposite axis, transverse thereto to provide some structural rigidity. The flexible sheet of material is tensioned by clamps to accurately conform to the contours of the precision parabolic mold. A supporting framework comprising a number of approximately parabolic, by non-precision, support ribs joined together by a torque resisting tube or other similar stiffener is then rigidly bonded, by a flowable hardening cement, to the convex back surface of the trough shaped collector sheet while it is in place over the precision mold. When the cement has hardened, the interstacies between the non-precision support ribs and the back surface of the precision formed sheet of flexible material are intimately bonded together and filled by the flowable hardening cement so that even, strong and continuous contact is achieved. The restraining clamps holding the flexible sheet to the precision mold may then be released and the sheet will be faithfully maintained in its formed curvature by the support ribs and framework. The flowable hardening bonding cement maintains precision contact between the non-precision ribs and the precision arcuate surface produced by bending the sheet over the mold.

DESCRIPTION OF THE DRAWINGS

FIG. 2C illustrates an end elevation view of an alternative structure shown in FIG. 2A.

DETAILED DESCRIPTION OF THE INVENTION

Figure 1:
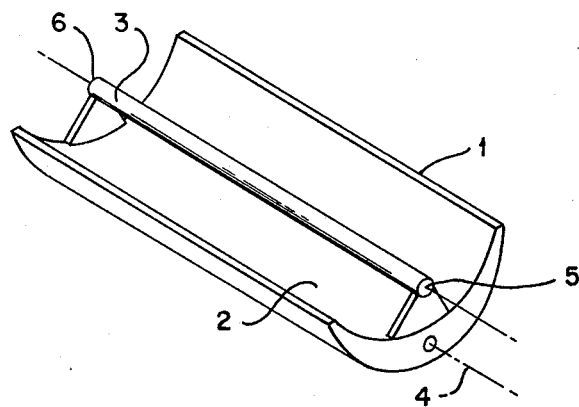
FIG. 1 illustrates an overall view of a typical parabolic trough collector of the general type intended in the present invention.

The parabolic solar concentrator has a number of physical attributes which contribute to the total error in focusing the solar radiation beam on the collector/target, such as:
1. Surface irregularities in the reflective material.
2. Small surface distortions, such as local fastener pull.
3. Contour errors.
4. Longitudinal straightness errors.
5. Static longitudinal twist in the structure.
6. Wind and position induced surface distortions.
7. Coupling back-lash between the tracking controller and the reflector.
8. Cumulative coupling back-lash and torgue tube wind-up errors in multiple satellite concentrators which are driven by connecting torque tubes to the master concentrator.
9. Dead band in the two direction tracking controller.
10. Sun geometry image.

The design allocation of the maximum target error band to the various attributes is a cost benefit exercise which dramatically affects the feasibility of certain concentrator arrangements and the cost of the system.

The theoretical maximum efficiency attainable by solar collectors is in excess of 90%. The maximum efficiency attained in practice, requiring extremely high and costly precision, is 86%. The method and apparatus of the present invention attains 84% efficiency without recourse to expensive machining. Accordingly, as used herein, the term "high precision" is understood to embody tolerances exemplified by the following:

Longitudinal bow—0.040" in 16'
Longitudinal twist—15 minutes in 16'
Contour error—0.015" max.
Fastener/glue shrink pull—0.003" max.
Local longitudinal surface
errors—0.003" max.
Local radius surface errors—0.001"/inch One skilled in the art and familiar with machining practices would readily recognize that such tolerances would ordinarily require unusually high precision in fabrication techniques.

The preferred method of forming precision parabolic collectors of the trough style will be described together with a preferred embodiment of the resulting apparatus. It should be clearly understood at the outset, however, that the specific embodiment disclosed is capable of many variations conventionally and otherwise which will be apparent to those of skill in the art and it is therefore not intended that the invention be in any way limited by the specifics of the preferred embodiment described.

The preferred embodiment and the preferred method of making the precision parabolic reflectors of the present invention will be described with reference to the aforementioned several figures of the drawing.

Proceeding now to a detailed description of the preferred embodiment and method of making precision parabolic trough shaped collectors or concentrators, reference will be had to FIG. 1 in which a typical trough shaped parabolic solar concentrator is illustrated.

Parabolic reflector 1 comprises a precision formed parabolic reflecting surface 2 elongated in the direction of its focal axis to form a trough. The rays of the sun are caused to focus and form an image of the sun along the collector tube 3 which is generally a high temperature, high pressure resistant material for conducting the flow of a primary collection liquid as is well known in the art. Typical inlet means 5 and outlet means 6 are provided to the collection tube 4 as shown, but the details of the apparatus for providing a flow of fluid through the collection zone in collection tube 3, being well known in the art, are omitted for the sake of brevity. The trough shaped collector 1 is generally provided with means for tracking the sun about an axis 4 and sometimes two axes of tracking freedom may be provided if desired as is also well known in the art. With this brief overview of the intended resultant structure, reference will be had to FIG. 2A.

Figure 2A:
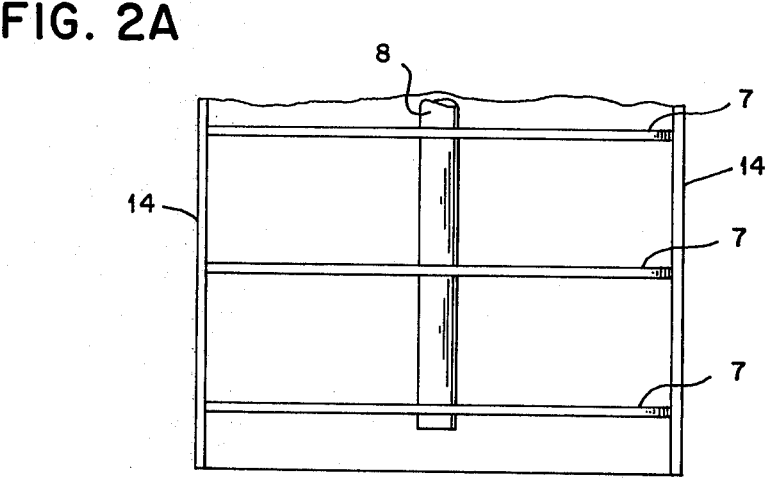
FIG. 2A illustrates a backside, or convex side, of the structure of the preferred embodiment constructed according to the techniques of the preferred method of the invention.

In FIG. 2A, the schematic structure of the preferred embodiment of the collector formed according to the present method is shown in which the backside (convex side) of the precision parabolic surface 2 is shown supported by a series of generally parabolic support ribs 7 which are rigidly joined together by a steel torque resisting tube 8. An edge reinforcement strip and clamping means 14 are affixed to edges of the flexible sheet of material which forms the precision parabolic surface 2. Strips 14 may be wood or metal as desired and may be bonded, screwed, or nailed to the flexible sheet of material 2. The purpose of edge reinforcing strips 14 will appear below.

Figure 2B:
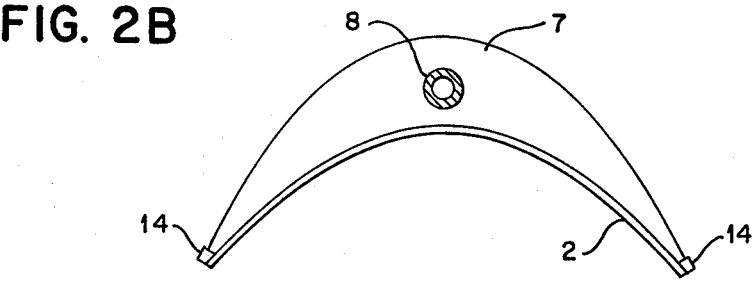
FIG. 2B illustrates an end elevation view of the structure shown in FIG. 2A.

Turning to FIG. 2B, an end elevation view of the structure shown in FIG. 2A is illustrated, In FIG. 2B, it may be clearly seen that the reinforcing and support webs or ribs 7 are in approximately continuous contact with the back surface of the precision parabolic surface 2 which is formed of a sheet of flexible material in a manner to be shown below. The steel reinforcing torque tube 8 is rigidly bonded to all of the various support ribs or webs 7 to take up longitudinal torsional variations which would tend to distort the curvature of the reflector surface 2.

In the preferred embodiment, the flexible sheet of material used to form the reflector surface 2 is a sheet of bonded and compressed wood fiber of the type generally known under the trade name tempered Masonite. However, other suitable materials would be flexible steel or aluminum sheets, plastic or glass fiber and resin impregnated material in sheet form, plywood or other generally flexible not hard sheet material which is bendable in at least one axis of bending and relatively impervious to the elements. The reinforcing ribs 7 are preferably resin bonded particle board of $\frac{3}{4}$ or $\frac{5}{8}$ inch thickness or plywood with the marine environment grade bonding glue utilized in their construction. Such materials are utilized for their temperature stability, resistance to moisture and low cost and weight. Steel torque tube 8 is a 2 to 4 inch diameter steel well casing or similar steel or high strength tube of the thin-walled type, and it is bonded to the ribs 7 by a polyester resin or epoxy resin cement in the preferred embodiment and may also be mechanically fastened to the ribs. The reflector surface is formed on the concave side of sheet 2 by utilizing thin aluminized polyester polyamide, or similar sheets commercially available and well known in the art which have an adhesive backing or which may be cemented in place to faithfully duplicate the precision parabolic shape of the surface 2 and to reflect the sun toward the focal point as shown in FIG. 1. Such details, being well known in the art, will not be described further.

FIG. 2C shows an alternate preferred embodiment of the bracing means wherein the torque tube 8 is omitted and instead a flexible sheet 17 of bendable material, such as Masonite or sheet aluminum, is secured to the convex surface of rib 7, as by bonding or fasteners, whereby to form an internally rib reinforced structure or composite shell.

Figure 3:
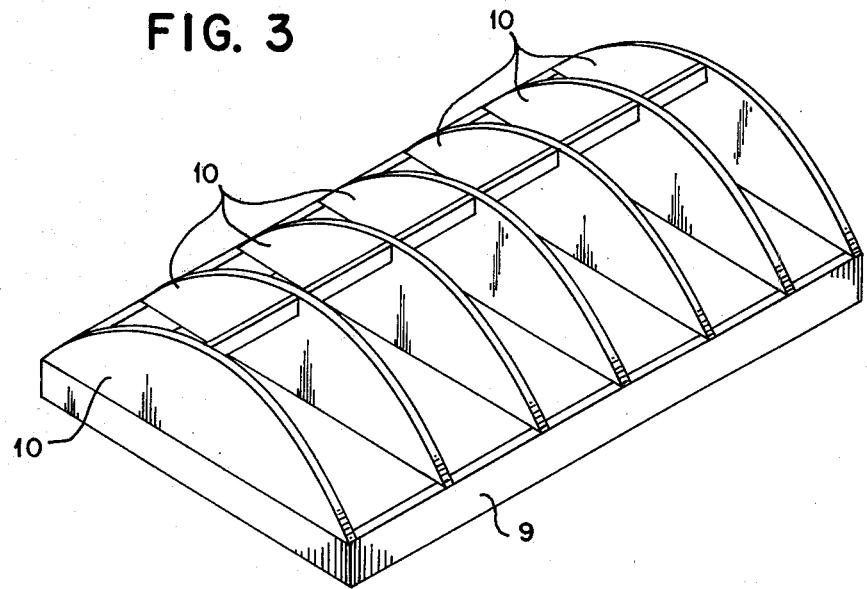
FIG. 3 illustrates the preferred embodiment of a precision parabolic mold utilized in the preferred fabrication technique.

Turning to FIG. 3, the preferred precision mold utilized in the technique of the present invention is illustrated in schematic form. A rigid base framework 9 of the preferred type is constructed of 6" welded structural steel channel, but heavy timbers may be utilized. In the preferred embodiment, this base was formed of 6" structural channel heavily braced and cross-braced and rigidly welded at all joints and at the corners. Base 9 is precision levelled and rigidly mounted to the floor or similar stable platform so that a true plane for the edges of the trough will be created. To this rigid base 9 are rigidly mounted a number of precision formed arcuate rib panels 10 made of $\frac{3}{4}$ inch resin bonded particle board or plywood braced and maintained in vertical orientation with respect to the base 9. The individual precision parabolic ribs 10 are joined together by spacers 11 made of dimensional 2×6 inch lumber and the entire assembly is rigidly bonded and screwed together in the preferred embodiment to provide a rigid and stable mold surface as defined by the outline of the arcuate ribs 10. Steel, aluminum or other durable materials would serve equally well in the making of a mold. This convex mold is utilized as a stretcher frame for forming the flexible sheet 2 as will be described below.

Figure 4:
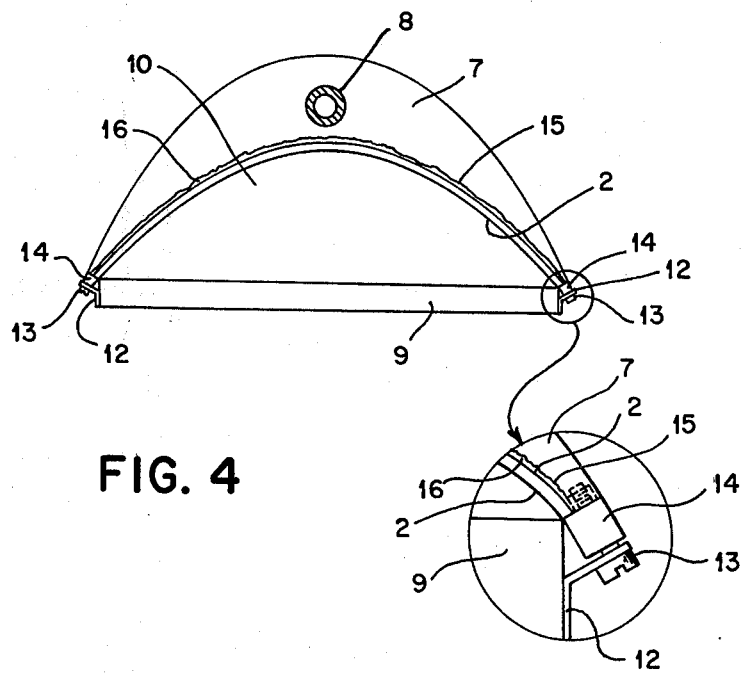
FIG. 4 illustrates the preferred method of forming precision parabolic reflectors according to the present invention.

Turning to FIG. 4, the mold of FIG. 3 is shown in the end elevational view so that the end of base 9 and the end-most precision parabolic rib 10 are visible. A clamp device is shown comprising an angle iron bracket 12 rigidly affixed on each side of base 9 which has a hole through which a threaded screw 13 can slide freely. Each threaded screw 13 engages with a threaded nut backing up against the surface of the edge reinforcing stringer 14 illustrated and described with relation to FIG. 2a. Stringer 14 is, as noted earlier, bonded and screwed to the edge of the flexible sheet 2. Individual clamp means 12, 13 and 14 with the cooperating nut, shown in the enlarged small view, are located every 4 inches (more or less) along the entire length of the trough shaped panel 2 so that uniform and exact bending tension can be produced in sheet 2 to draw it into intimate conformity with the precision formed parabolic ribs 10. Camming action clamps, screw clamps or any of a variety of clamps readily available could be thus used. Once sheet 2 has been drawn into intimate and exact conformity to the shape of the precision ribs 10, the support framework comprising numerous support ribs 7 to be bonded and bolted to the steel torque tube 8 and described previously with relation to FIGS. 2a and 2b, can be brought into position as shown and bonded, using a relatively thick layer of cement, such as epoxy or polyester resin in the preferred embodiment, to the back or convex surface of sheet 2. The entire resulting assembly may be left for the cement to cure. It should be pointed out and emphasized that the reinforcing ribs (or webs) 7 need not be of a precision parabolic shape and, indeed, it is a major object of the present invention to avoid the necessity of having precision cutting and forming operations beyond those necessary to construct the initial precision mold. To that end, an exaggerated rough under surface of the rib 7 is illustrated as rough surface 15 for each rib 7. Numerous intersticies and arcuate discrepancies are shown in exaggerated form, but are filled with a flowable and hardenable epoxy or polyester cement illustrated as cement filler 16 so that the resultant bond between ribs 7 of the non-precision, approximately parabolic shape and the back or convex surface of the parabolic form of sheet 2 is achieved. The cement or bonding agent 16 that is used to attach the ribs 7 to the back side of the parabolic sheet 2 is preferably of a type that does not, upon hardening or setting, draw or otherwise distort the precision concave face of the sheet 2. The resulting webs (ribs 7) approximate constant beams in their deflection characteristic so that the stresses in the flexible sheet are approximately equally distributed. When cement 16 has cured, the intimate and continuous bond between the roughly parabolic shape of rib 7 and the precision parabolic shape of the back surface of sheet 2 is achieved and the precision surface of sheet 2 is maintained accurately and faithfully upon the release of the clamping means 12, 13 and 14. The finished form may then be supplied with polished aluminum sheets on the reflecting side of precision form trough sheet 2 or, as described previously, a flexible aluminized plastic sheet may be adhered to the curved surface to form a reflective trough concentrator. If desired, the overall resulting structure may be supplied with an overcoat of clear epoxy or similar sealer to seal out moisture and airborn foreign materials. However, it will, of course, be understood by one skilled in the art that the reflective, concave parabolic base of sheet 2 may be inherent in the sheet itself, such as when using a sheet 2 of aluminum or other polished reflective metal, or the reflective material may be deposited on the sheet by the well known vacuum depositing technique or by stick on adhesive backed high reflective material such as 3M-5400 reflective material.

As will be immediately appreciated by those of skill in the art, the present method for forming precision parabolic trough reflectors may be easily practiced without resort to expensive operations such as precision forming of structural reinforcing ribs or precision molding of rigid or plastic materials (such as solid metal sheets bent to retain the parabolic shape) and a simple, unified and highly precision final form with high structural integrity and resistance to deformation can be achieved. Low cost materials and techniques are utilized throughout and panels of the desired trough shape may be formed of varying lengths from a few feet to as long as desired.

The precision arcuate mold ribs 10 were traced from a precision pattern full scale on $\frac{5}{8}$ or $\frac{3}{4}$ inch thickness particle board and all ribs cut. A pattern following router following a precision steel pattern is preferred. Another method is to simultaneously cut all of the ribs from a stack of rough formed pieces using a band saw with final precision sanding to achieve true conformity to the exact parabolic curvature desired. Utilized as they are, these ribs 10 are not subject to wear or deterioration and may be used indefinitely once they have been mounted to the base 9 as shown. If desired, steel mold pieces for the ultimate in durability could be used. Other molding techniques, such as the well-known glass fiber and resin lay-up or spraying techniques, require continuous surface precision molds which are expensive to produce initially and require continual refinishing or resurfacing due to deterioration in the surface after repeated use and are thus of lesser utility that the preferred method described. Another obviously equivalent molding technique would be to use a concave precision mold structure (the converse of FIG. 3) and to push the flexible sheet into tight conformity with the mold ribs. However, this technique would make the attachment of the support framework and arcuate ribs more difficult and the details of the mold to allow such application steps would be much more complex.

As noted earlier, the reinforcing support ribs 7 of the framework which support the formed panel sheet 2 need not be precision formed but may be rough cut to the approximate outline desired. This leaves to the flowable and hardening bonding cement the task of producing a uniform and true conformance between the back surface of the precision formed panel 2 and the non-uniform, non-precision formed undersurface of the arcuate ribs 7. This greatly reduces the cost and complexity in forming the collector apparatus since none of the assembly techniques or elements need be precision operations once the precision mold has been made. Yet the resulting parabolic trough shaped concentrator is a highly precision surface which faithfully mirrors the desired accurate parabolic form to provide the superior results known in the art to be achievable in the art with this type of collector.

Having thus described my invention, its method of manufacture, and the resulting structure with reference to the preferred embodiment and the several figures described, what is claimed is:

1. A method of making trough-shaped high precision parabolic reflectors, comprising the steps of:
   bending a sheet of inelastic flexible material over a precision parabolically contoured trough-shaped rigid, convex mold fixture;
   forcing said sheet of material into continuous and intimate contact with said mold fixture to tension said sheet of inelastic flexible material at the edges thereof which are parallel to the focal axis of said mold fixture, thereby conforming said sheet into a high precision parbolically curved trough-shape;
   centering a plurality of spaced apart, non-precision, reinforcing ribs to the convex surface of said flexible material with a flowable and hard-curable cement while it is so bent and forced into high precision conformality with said mold fixture, said ribs being affixed perpendicularly to said focal axis of said parabolic trough and perpendicularly to said convex surface at regular intervals along the axis of said trough shape;
   curing said cement whereby the intersticies between said non-precision support ribs and the back surface of said precision formed sheet of flexible material are intimately bonded together and completely filled by the said hard-curable cement so that even, strong and continuous contact is achieved;
   removing the resulting parabolic trough-shaped sheet, maintained in high precision configuration by said reinforcing ribs, from said mold fixture; and
   providing the concave precision curved parabolic surface of said sheet with light reflective capability, thus completing the formation of said high precision parabolically curved trough-shaped reflector.

2. The method as described in claim 1, wherein said flexible material is aluminum and said light reflective capability of said concave precision curved parabolic surface is polished aluminum.

3. The method as described in claim 1, wherein said concave precision curved parabolic sheet is provided with light capability by depositing reflective material thereon by vacuum deposition.

4. The method as described in claim 1, wherein said concave precision curved parabolic sheet is provided with light capability by depositing stick on adhesive backed reflective material thereon.

5. The method as described in claim 1 further comprising a step of;
   joining said plurality of said reinforcing ribs together by a stiffening member affixed thereto, said stiffening member being generally parallel with said focal axis of said parabolic surface.

6. The method as described in claim 1 further comprising a step of:
   joining said plurality of said reinforcing ribs together by a stiffening member affixed thereto, said stiffening member comprising a flexible sheet secured to the convex surface of each said rib, whereby to form an internally rib reinforced structure or composite shell.

* * * * *